United States Patent
Sakata et al.

(10) Patent No.: US 8,465,074 B2
(45) Date of Patent: Jun. 18, 2013

(54) PICK-UP STYLE UTILITY VEHICLE WITH EXPANDABLE CARGO BED

(75) Inventors: Masashi Sakata, Kobe (JP); Yuuki Iwamoto, Nishinomiya (JP); Yaoki Hayashi, Osaka (JP); Shigeto Nakamura, Himeji (JP); Yoshiya Takehara, Kakogawa (JP); Hirokazu Morita, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 479 days.

(21) Appl. No.: 12/647,792

(22) Filed: Dec. 28, 2009

(65) Prior Publication Data
US 2011/0156439 A1 Jun. 30, 2011

(51) Int. Cl.
*B65D 25/06* (2006.01)
(52) U.S. Cl.
USPC .................... 296/24.43; 296/186.4
(58) Field of Classification Search
USPC ........... 296/182.1, 183.1, 186.1, 186.4, 186.5, 296/24.4, 24.41, 24.42, 24.43, 24.46; 410/129, 410/142
See application file for complete search history.

(56) References Cited

U.S. PATENT DOCUMENTS

| | | | |
|---|---|---|---|
| RE27,034 E * | 1/1971 | Bezla | 410/54 |
| 3,653,153 A * | 4/1972 | Nagy | 49/220 |
| 6,905,159 B1 | 6/2005 | Saito et al. | |
| 6,994,388 B2 | 2/2006 | Saito et al. | |
| 7,249,798 B2 | 7/2007 | Saito et al. | |

* cited by examiner

*Primary Examiner* — Joseph Pape
(74) *Attorney, Agent, or Firm* — Wenderoth, Lind & Ponack, LLP

(57) ABSTRACT

A pick-up style utility vehicle having a front seat, a rear seat, and a cargo bed in this order from the front of the vehicle. The vehicle also includes a screen shield partitioning the cargo bed and a riding space in front of the cargo bed. The cargo bed is changeable between an expanded state and a non-expanded state. The screen shield is shiftable between an expanded position corresponding to the expanded state of the cargo bed and a non-expanded position corresponding to the non-expanded state of the cargo bed. Fixing devices are provided to fix the screen shield in each of the expanded position and the non-expanded position. The screen shield fixing devices have pin insertion holes of the screen shield, pin insertion holes at the upper ends of side panels, and pins provided so as to be separable from the screen shield and a front panel.

2 Claims, 21 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle having a cargo bed that is expandable in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly developed the inventions relating to the pick-up style utility vehicle with a cargo bed whose area or capacity can be expanded. These inventions are disclosed in, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from the front. The rear seat can be changed between a used state and a retracted state to switch between a 2 passengers transformation and a 4 passengers transformation. In the 2 passengers transformation, a front portion of the cargo bed can be expanded into a riding space occupied by the rear seat in the used state.

Typically, a screen shield is provided at the front end of the cargo bed of the pick-up style utility vehicle so as to prevent a load loaded on the cargo bed from moving into the riding space in front of the cargo bed. The screen shield need be changed between the 2 passengers transformation expanding the cargo bed in a front direction, and the 4 passengers transformation not expanding the cargo bed.

FIG. 21 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410 for positioning and fixing protruded in a downward direction are provided at the right and left ends of the screen shield 407. Pin insertion holes 411 and 412, into which the pins 410 of the screen shield 407 can be inserted, are formed in the upper surface of the end of each of the expandable side panels 404 and the upper surface of the front end of each of the stationary side panels 402. Moreover, a front panel fixing means 430 is provided at a lower portion of the front face of the front panel 406. The front panel fixing means has different pins from above-described the pins.

As indicated by the solid lines in FIG. 21, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 is moved between an expanded position when the cargo bed 400 is expanded and a non-expanded position when the cargo bed 400 is not expanded. The screen shield 407 need be lifted together with the front panel 406 to pull out the right and left pins 410 from the pin insertion holes 411 or 412. The screen shield 407 and the front panel 406 then need be integrally moved in a rear or front direction. After the movement, the pins 410 need be inserted into the pin insertion holes 412 or 411 from above again.

However, the weight of the screen shield 407 is substantial, and a width of the screen shield 407 extends throughout substantially the whole width of the cargo bed 400. Consequently, it is very difficult for one person to move the screen shield 407. Particularly, the screen shield 407, which integrally has the front panel 406, must be lifted and moved together with the front panel. Accordingly, at present, the left and right ends of the screen shield 407 and the front panel 406 need be held and lifted by two operators to pull out the pins 410. After this movement, the pins 410 need be inserted into the pin insertion holes 411 or 412 again. Thus, the movement of the screen shield 407 takes a long time. In addition, since the front panel fixing means 430 are provided on the front surface of the front panel 406, the front seat obstructs the operation of the second fixing means. When the cargo bed is contracted to change the 2 passengers transformation to the 4 passengers transformation, the front seat is located in front of the front panel 406 of the cargo bed in the expanded state, thereby obstructing the releasing or fixing operation of the front panel fixing means 430. When the operator is on the cargo bed during the movement operation, the front panel fixing means 430 are located in positions in which it is difficult for the operator to see.

SUMMARY OF THE INVENTION

The present invention has been made in view of the above problems and an object of the present invention is to easily and immediately perform an expanding or contracting operation of a cargo bed and a moving or fixing operation of a screen shield with the operation by one operator.

To achieve the above object, the present invention provides a pick-up style utility vehicle having a front seat, a rear seat, and a cargo bed in this order from front, and a screen shield partitioning the cargo bed and a riding space in front of the cargo bed. The cargo bed is changeable between an expanded state in which the cargo bed is expanded forward into the riding space and a non-expanded state in which the cargo bed does not occupy the riding space. The pick-up style utility vehicle has the following features.

A first aspect of the present invention features screen shield fixing means. The screen shield is shiftable between an expanded position corresponding to the expanded state of the cargo bed and a non-expanded position corresponding to the non-expanded state of the cargo bed. Screen shield fixing means are provided to fix the screen shield to side panels of the cargo bed in the expanded position and the non-expanded position. The screen shield fixing means have pin insertion holes of the screen shield, pin insertion holes of the vehicle body configuring portions, and pins provided so as to be separable from the screen shield and the vehicle body configuring portions and inserted into the pin insertion holes so as to be pulled out. The vehicle body configuring portions are the side panels of the cargo bed.

With the above configuration, in the operation of expanding or contracting the cargo bed, the pins, which are separable from the screen shield and the front panel, are pulled out. Thus, the screen shield is changeable between the expanded position and the non-expand position without lifting the screen shield and the front panel. By slidably moving the screen shield and the front panel, one operator can easily change the position of the screen shield and the front panel.

A second aspect of the present invention also features screen shield fixing means. The screen shield is shiftable between an expanded position corresponding to the expanded state of the cargo bed and a non-expanded position corresponding to the non-expanded state of the cargo bed. Screen shield fixing means are provided to fix the screen shield to vehicle body configuring portions in each of the expanded position and the non-expanded position. The screen shield fixing means have pins provided on the screen shield and protruded downward and pin insertion holes of the vehicle body configuring portions, and the outer circumferential surfaces of the pins and the inner circumferential surfaces of the pin insertion holes are formed in a tapered shape in which the diameter is reduced downward. The vehicle body configuring portions are the side panels of the cargo bed.

With the above configuration, when the screen shield is moved and the positions of the pins are shifted from the pin insertion holes, the pins can be inserted into the pin insertion holes. After insertion, the screen shield can be automatically fixed in the predetermined fixed position due to the guide function of the taper.

A third aspect of the present invention also features screen shield fixing means. A pair of side panels of the cargo bed have a pair of stationary side panels and expandable side panels rotatably coupled to the front ends of the pair of stationary side panels via hinge shafts and changeable between an expanded position in which the expandable side panels are extended forward and a non-expanded position in which the expandable side panels are extended inward in a vehicle width direction. The screen shield is shiftable between an expanded position corresponding to the expanded state of the cargo bed and a non-expanded position corresponding to the non-expanded state of the cargo bed. Screen shield fixing means are provided to fix the screen shield to the side panels of the cargo bed in the expanded position and the non-expanded position. The screen shield fixing means have a pair of rods provided at both ends of the screen shield in a width direction and protruded downward and rod insertion holes for the expanded position and rod insertion holes for the non-expanded position provided in the expandable side panels. Each of the rod insertion holes has an opened surface in which the rod can be inserted into and removed from one side of the expandable side panel.

With the above configuration, the screen shield can be rotated about the hinge shafts without being lifted, so that the rods can be inserted into and removed from the open type pin insertion holes of the expandable side panels. Therefore, the position of the screen shield can be easily changed and fixed.

According to the third aspect of the present invention, preferably, a cover member, which opens and closes the opened surface of each of the rod insertion holes, is provided on the expandable side panel.

With the above configuration, after position change, the rod can be prevented from falling out of the predetermined position.

A fourth aspect of the present invention features front panel fixing means of the cargo bed. The screen shield is integrally connected with a front panel of the cargo bed and is shiftable between an expanded position corresponding to the expanded state of the cargo bed and a non-expanded position corresponding to the non-expanded state of the cargo bed. Front panel fixing means are provided to fix the front panel to side panels of the cargo bed or the bottom plate of the cargo bed in the expanded position and the non-expanded position. The front panel fixing means are provided on the rear surface of the front panel. According to the fourth aspect of the present invention, preferably, the front panel fixing means have pin insertion holes provided in the side panels and pins provided in the screen shield and insertable into the pin insertion holes.

With the above configuration, the operator on the cargo bed can operate the front panel fixing means in any of the expanded position and the non-expanded position without the front seat and the rear seat being an obstacle.

A fifth aspect of the present invention also features front panel fixing means. The screen shield integrally has a front panel of the cargo bed and is shiftable between an expanded position corresponding to the expanded state of the cargo bed and a non-expanded position corresponding to the non-expanded state of the cargo bed. Front panel fixing means are provided to fix the front panel to side panels of the cargo bed in the expanded position and the non-expanded position. The front panel fixing means have a pair of rod insertion holes provided in both of the side panels, a pair of rods insertable into the rod insertion holes, and an operating portion for operating both of the rods at the same time. According to the fifth aspect of the present invention, as one example, the operating portion can have rack teeth formed in both of the rods and one rotatable pinion engaging the rack teeth. As another example, the operating portion can have a rotatable rotational shaft and link mechanisms coupling the rotational shaft and both of the rods. Preferably, the operating portion can be arranged in the center portion of the cargo bed in a width direction.

With the above configuration, two lock positions can be locked and unlocked at the same time by the operation of the operating portion in one position.

DETAILED DESCRIPTION OF THE PREFERRED EMBODIMENTS

First Embodiment

Figure 1:
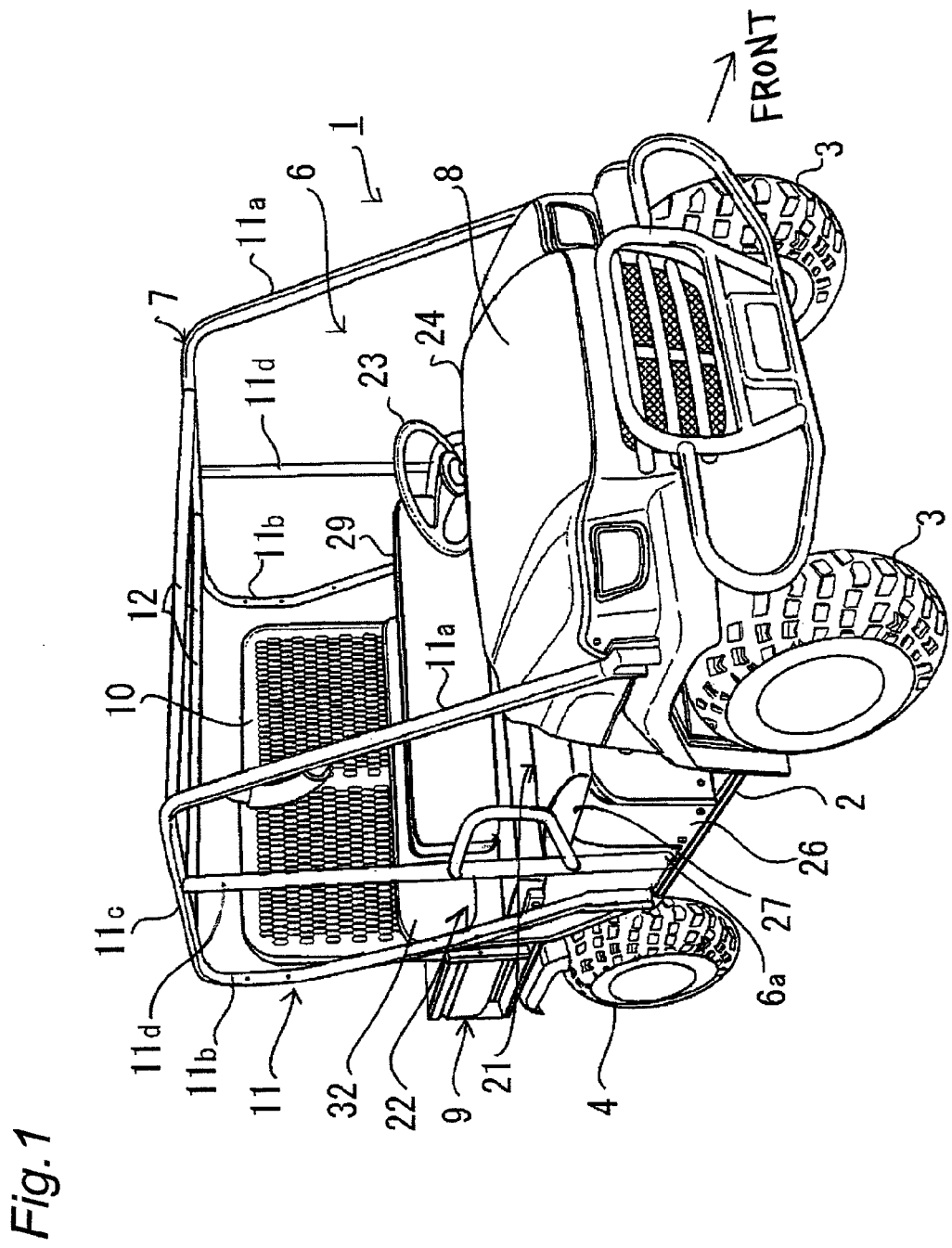
FIG. 1 is an overall perspective view of a pick-up style utility vehicle according to a first embodiment of the present invention.
Figure 2:
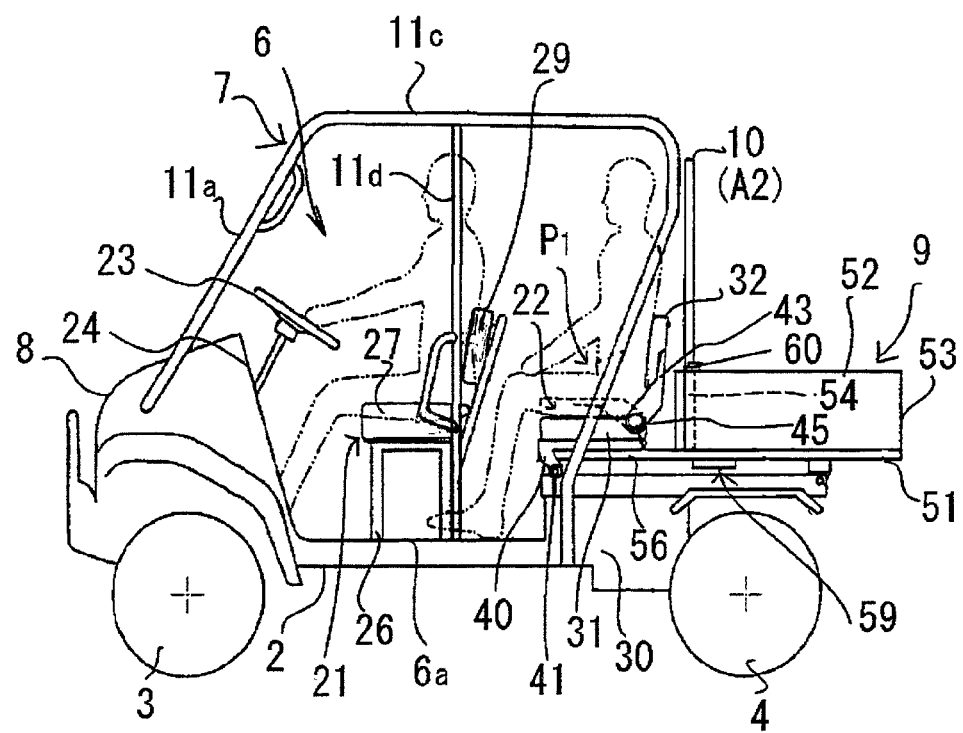
FIG. 2 is a left side view of the pick-up style utility vehicle of FIG. 1 when a cargo bed is not expanded.
Figure 3:
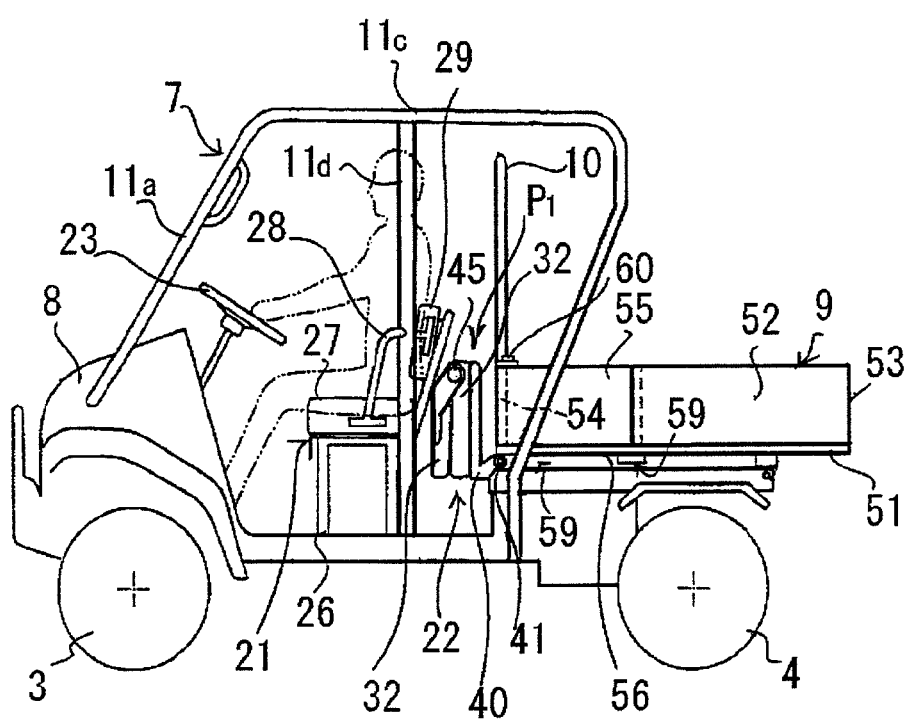
FIG. 3 is a left side view of the pick-up style utility vehicle of FIG. 1 when the cargo bed is expanded.

FIGS. 1 to 5 show a pick-up style utility vehicle with an expandable cargo bed according to a first embodiment of the present invention. The pick-up style utility vehicle can be changed between a 4 passengers transformation contracting a cargo bed 9, as shown in FIG. 2 and a 2 passengers transformation in which a rear seat 22 is folded and the cargo bed 9 is expanded in a front direction, as shown in FIG. 3. A configuration of the pick-up style utility vehicle will be described below in detail with reference to the drawings.

FIG. 1 is a perspective view of the pick-up style utility vehicle. A pick-up style utility vehicle 1 has a vehicle body 2 supported by a pair of right and left front wheels 3 and a pair of right and left rear wheels 4. A cabin frame 7 configuring a cabin 6 is provided in an intermediate portion above the vehicle body 2 in a front or rear direction. A hood 8 is provided in front of the cabin frame 7. The cargo bed 9 is provided behind the cabin frame 7. A screen shield 10 partitioning the cargo bed 9 and a riding space is provided at a front end of the cargo bed 9 so as to be adjustable in a front or rear direction.

The cabin frame 7 surrounding the cabin 6 has a pair of right and left side frame members 11 formed in a U shape and made of a metal pipe, and a plurality of cross frame members 12 made of a metal pipe coupling the side frame members 11. Each of the side frame members 11 has a front side portion 11a extended in a rear direction and in an upward direction from near the right or left side portion of the hood 8, a rear side portion 11b extended in a substantially upward direction from the right or left side portion at the rear end of the cabin 6, an upper side portion 11c integrally coupling the upper end of the front side portion 11a and the upper end of the rear side portion 11b and extended in a front or rear direction, and an intermediate longitudinal portion 11d coupling the intermediate portion of the upper side portion 11c in a front or rear direction and a floor surface 6a.

A bench-shaped front seat 21 is installed in the front half of the cabin 6. The bench-shaped rear seat 22 of a folding type is installed in the rear half portion of the cabin 6. A dashboard (operating portion) 24 having a steering wheel 23 and the like is provided at the front end of the cabin 6.

FIG. 2 is a left side view of the pick-up style utility vehicle in the 4 passengers transformation. The bench-shaped front seat 21 has a seat leg 26 erected on the floor surface 6a of the cabin 6, a seat bottom 27 provided on the upper end face of the seat leg 26, and a backrest 29 fixed via a supporting stay on the intermediate longitudinal portion 11d. The bench-shaped front seat 21 is typically extended in a right or left direction to near the right or left end of the cabin 6. With this configuration, two persons can be seated side by side. A driver can be seated on one of seating areas (left side) and a passenger can be seated on the other seating area. The bench-shaped rear seat 22 has a seat bottom 31 arranged on the upper side of a box 30 housing an engine (not shown), and a backrest 32 (the configuration will be described later in detail). As in the front seat 21, the seat bottom 31 and the backrest 32 are extended in a right or left direction to near the right or left end of the cabin 6. Therefore, two passengers can be seated side by side.

The folding configuration of the rear seat 22 will be described in detail. The seat bottom 31 is fixed onto the upper surface of a supporting base 40. The front end of the supporting base 40 is rotatably supported at the front upper end of the box 30 via a hinge 41. A pair of right and left stays 43 extended in a downward direction is fixed onto the backrest 32. The lower end of each of the stays 43 is rotatably coupled to the rear end of the seat bottom 31 via a hinge 45.

FIG. 3 shows a folding state of the rear seat 21. The backrest 32 is rotated about the hinge 45 so as to be brought into contact with the upper surface of the seat bottom 31. The seat bottom 31 is then rotated about the hinge 41 together with the backrest 32 so as to be substantially vertical. The rear seat 22 is folded in the retracted state of FIG. 3. The rear seat 22 is folded and retracted to use a rear portion riding space P1 as the forward expanded space of the cargo bed 9.

Figure 4:
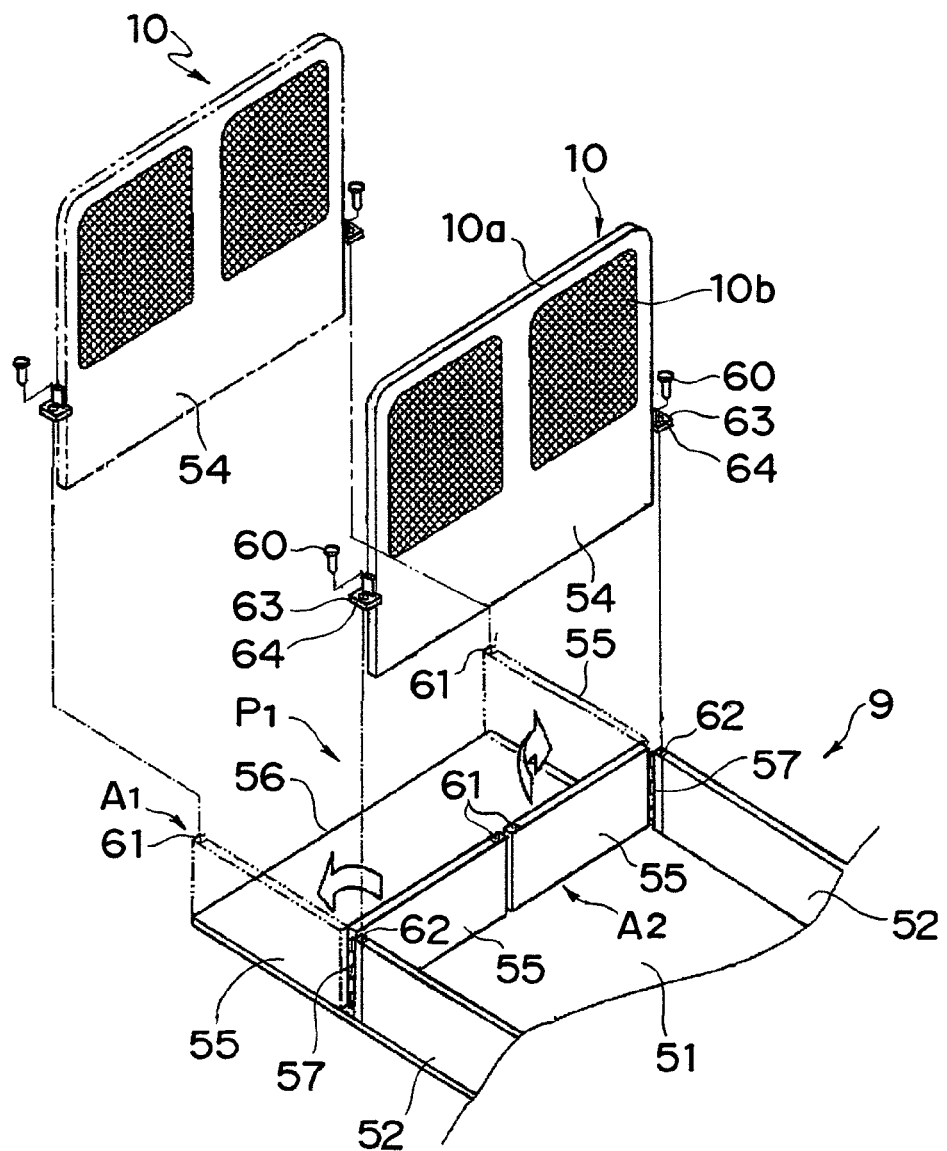
FIG. 4 is a perspective view showing the pick-up style utility vehicle of FIG. 1 when the cargo bed is expanded and is not expanded.

A configuration of the expandable cargo bed 9 will be described in detail. FIG. 4 is a simplified perspective view of the expandable cargo bed 9 and the screen shield 10. The screen shield 10 has a frame 10a formed in a U shape and made of a metal pipe, and a resin or metal net 10b provided in the frame 10a. The cargo bed 9 has, as a basic configuration, a stationary bottom plate 51, a pair of stationary side panels 52 provided substantially perpendicular to the stationary bottom plate 51 along the right and left ends of the stationary bottom plate 51, a gate type rear panel 53 provided at the rear end of the stationary bottom plate 51 so as to be opened and closed, and a front panel 54 adjustable in a front or rear direction. In addition to these members, to expand the cargo bed 9 in a front direction, the cargo bed 9 has a pair of right and left expandable side panels 55, and an expandable bottom plate 56 extended in a front direction from the front end of the stationary bottom plate 51. The expandable side panels 55 are supported by the front ends of the stationary bottom plates 51 by hinge shafts 57.

According to the first embodiment, the expandable bottom plate 56 is integral with the stationary bottom plate 51 and is extended forward from the front end of the stationary bottom plate 51 on the same plane as the stationary bottom plate 51 into the rear riding space P1. The pair of expandable side panels 55 are rotated about the hinge shafts 57 perpendicular to the stationary bottom plate 51 and are position changeable between a non-expanded position in which the expandable side panels 55 are extended inward in a cargo bed width direction from the front ends of the stationary side panels 52 as indicated by solid lines and an expanded position in which the expandable side panels 55 are extended forward from the front ends of the stationary side panels 52 as indicated by imaginary lines.

The screen shield 10 is formed integrally with the front panel 54 so as to be extended upward from the upper end of the front panel 54 and can be fixed into an expanded position A1 and a non-expanded position A2 by a pair of pins 60 separated from the screen shield 10 and the front panel 54.

Screen shield fixing means using the pair of pins 60 will be described in detail.

In FIG. 4, attaching brackets 63 are fixed to both ends of the lower end of the screen shield 10 (corresponding to the upper end of the front panel 54) in a width direction. A pin insertion hole 61 is provided in the upper end face of the end of each of the expandable side panels 55. A pin insertion hole 62 is provided in the upper end face of the front end of each of the stationary side panels 52.

Figure 5:
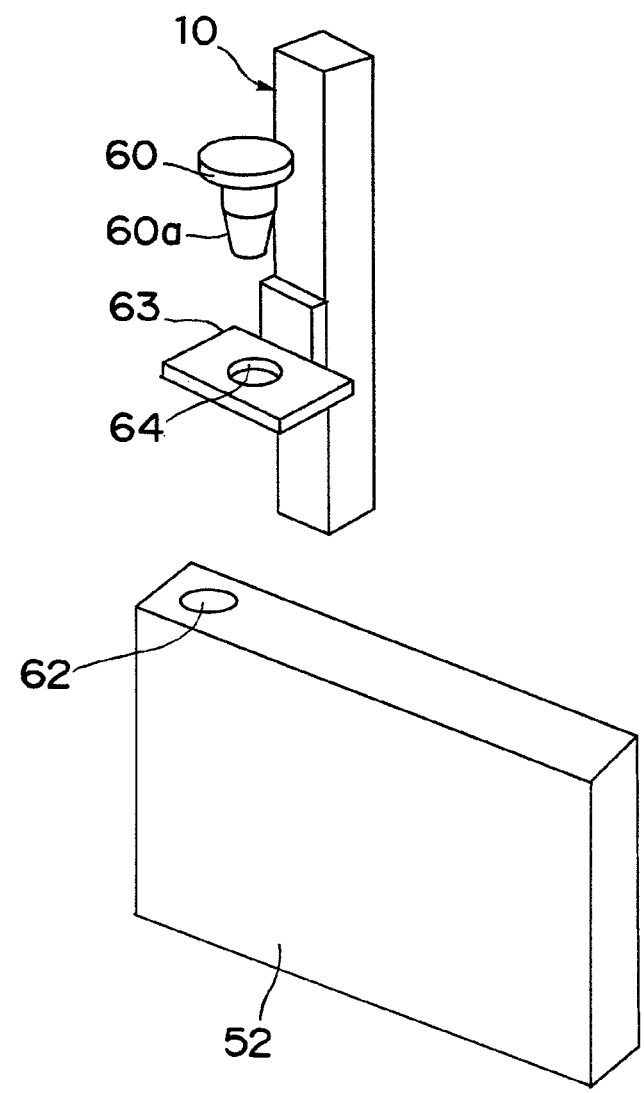
FIG. 5 is an enlarged perspective view showing screen shield fixing means of the cargo bed of FIG. 4.

FIG. 5 is an enlarged perspective view of the pin 60 and the attaching bracket 63. The attaching bracket 63 is formed in an L shape as seen from the rear. An outer circumferential surface 60a of the shaft portion of the pin 60 is formed in a taper shape in which the diameter is reduced downward.

In FIG. 4, the pins 60 are inserted into pin insertion holes 64 of the attaching brackets 63 of the screen shield 10 and the pin insertion holes 62 of the stationary side panels 52 so that the screen shield 10 and the front panel 54 can be fixed into the non-expanded position A2. The pins 60 are inserted into the pin insertion holes 64 of the attaching brackets 63 of the screen shield 10 and the pin insertion holes 61 of the expandable side panels 55 so that the screen shield 10 and the front panel 54 can be fixed into the expanded position A1.

The operation of changing 4 passengers transformation shown FIGS. 2 to 2 passengers transformation shown in FIG. 3 and expanding the cargo bed 9 will be described.

In 4 passengers transformation shown FIG. 2, the supporting base 40 and the seat bottom 31 of the rear seat 22 are located on the upper side of the expandable bottom plate 56 and the backrest 32 is erected upward. The front panel 54 of the cargo bed 9 is located in the non-expanded position A2 immediately behind the backrest 32. The screen shield 10 is located behind the backrest 32 of the rear seat 22 and in the position in which the cargo bed 9 and the rear riding space P1 are partitioned.

When the 4 passengers transformation is changed to the 2 passengers transformation, the backrest 32 of the rear seat 22 is rotated about the hinge 45 forward and is overlapped with the surface of the seat bottom 31. The seat bottom 31 and the backrest 32 are rotated about the hinge 41 forward together with the supporting base 40 and as shown in FIG. 3, are retracted in the space immediately behind the front seat 21 in a substantially erected state.

In FIG. 4, the expandable side panels 55 are rotated from the non-expanded position to the expanded position to pull both the pins 60 out of the pin insertion holes 63 and 62 in the non-expanded position A2. The screen shield 10 and the front panel 54 are slid forward. The screen shield 10 and the front panel 54 are moved so that the horizontal portions of both the attaching brackets 63 are slid on the upper end faces of the expandable side panels 55. Therefore, the screen shield 10 and the front panel 54 can be moved into the expanded position A1 without being lifted.

The screen shield 10 and the front panel 54 are moved to the expanded position A1 to insert the pins 60 into the pin insertion holes 63 and 61 in the expanded position A1. The screen shield 10 and the front panel 54 are fixed into the expanded position A1.

According to the embodiment, unlike the related art, the screen shield and the front panel need not be lifted in order to pull out and insert the pins, and can be slid and moved. The expanding operation of the cargo bed 9 and the moving operation of the screen shield 10 can be easily performed by one operator.

The outer circumferential surfaces 60a of the shaft portions of the pins 60 are formed in a taper shape. Therefore, when the pins 60 are inserted into and pulled out of the positions of the pin insertion holes 64 of the attaching brackets 63 and the positions of the pin insertion holes 61 of the expandable side panels 55 or the positions of the pin insertion holes 62 of the stationary side panels 52 are slightly shifted, both the pin insertion holes 64 and 62 (or 64 and 61) coincide with each other by the guide function of the taper so that the screen shield 10 can be fixed into the predetermined position.

When the 2 passengers transformation shown in FIG. 3 is changed to the 4 passengers transformation shown in FIG. 2 and the cargo bed 9 is contracted into the non-expanded state, the expanding operation may be reversed. Also in this case, the screen shield 10 and the front panel 54 need not be lifted and moved so that the contracting operation of the cargo bed 9 and the moving operation of the screen shield 10 can be easily performed by one person.

According to the first embodiment, the outer circumferential surfaces of the pins 60 and the inner circumferential surfaces of the pin insertion holes 61 and 62 are threaded, the pins 60 can be threaded into the pin insertion holes 61 and 62.

Modification of the First Embodiment

Figure 6:
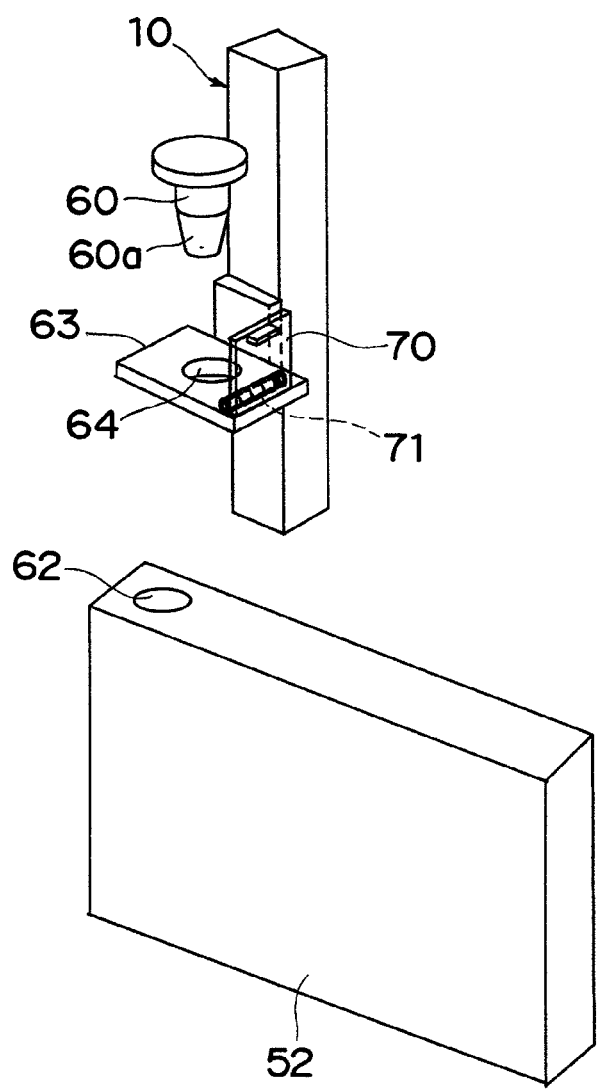
FIG. 6 is a perspective view showing a modified example of the screen shield fixing means of FIG. 4.
Figure 7:
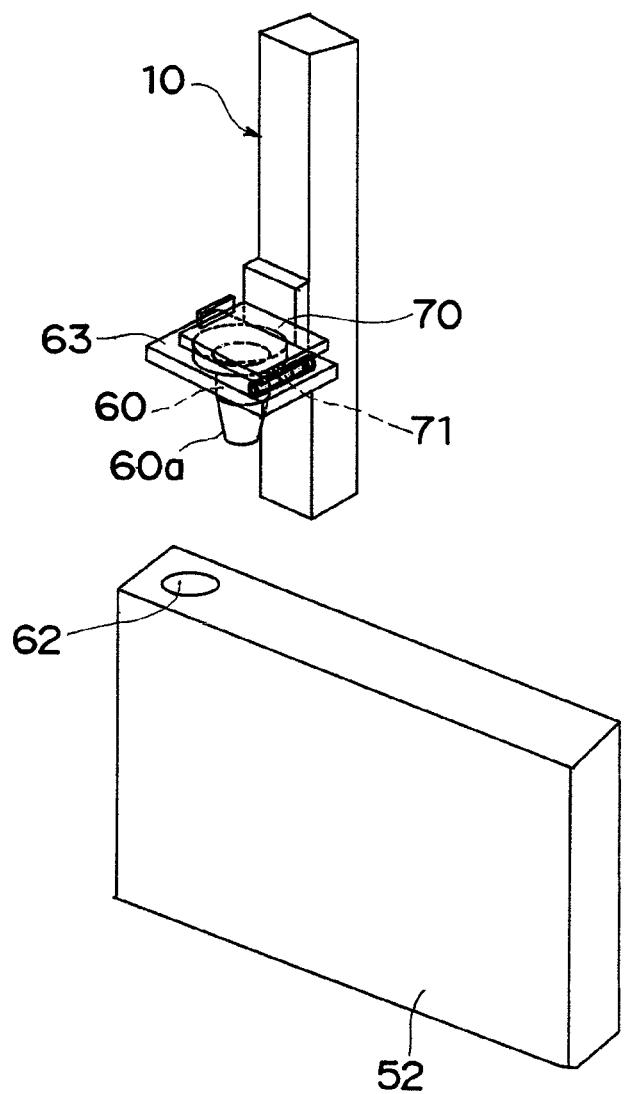
FIG. 7 is a perspective view showing the state in which the screen shield fixing means of FIG. 6 is locked.

FIGS. 6 and 7 show a variation of the first embodiment. A lock member 70 is provided on the attaching bracket 63 so as to lock the pin 60 for preventing it from falling. The lock member 70 is rotatably provided on the attaching bracket 63 via a substantially horizontal rotational shaft 71 and is urged downward by a coil spring (not shown).

The lock member 70 is rotatably operated between a non-lock position in which it is rotated upward against the coil spring to open the pin insertion hole 64 as shown in FIG. 6 and a lock position in which it is rotated downward by the resilient force of the coil spring to press the pin 60 from above as shown in FIG. 7. The modification example is the same as the first embodiment except for the configuration of the lock member 70.

Like the modification example, the pin 60 inserted into the pin insertion hole 64 can be pressed from above. Therefore, the falling of the pin 60 out of the pin insertion hole 64 due to vibration or shock during running can be prevented.

To prevent the falling of the pin 60, the pin 60 can be supported by the screen shield 10 so as to be movable upward and downward.

Second Embodiment

Figure 8:
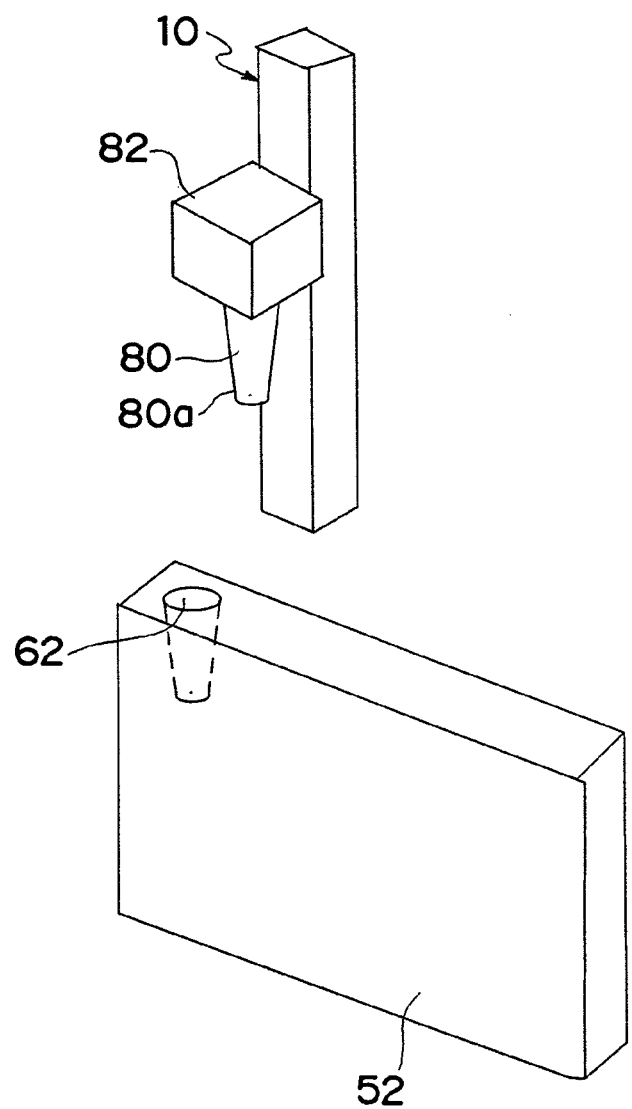
FIG. 8 is a perspective view of a screen shield fixing means according to a second embodiment of the present invention.

FIG. 8 shows a second embodiment of the present invention. The second embodiment has the same configuration as that of the first embodiment except that a pin 80 for fixing the screen shield 10 and the front panel 54 into the non-expanded position and the expanded position is fixed to the screen shield 10 and that the pin insertion hole 62 or the like provided in the stationary side panel 52 or the like is formed in a taper shape in which the diameter is reduced downward. Like components are indicated by like reference numerals.

An extended portion 82 extended in a cargo bed width direction is fixed to or formed integrally with either end of the lower end of the screen shield 10 in a width direction. The pin 80 protruded downward is provided on the lower surface of each of the extended portions 82. An outer circumferential surface 80a of the pin 80 is formed in a taper shape in which the diameter is reduced downward. The inner circumferential surface of the pin insertion hole 62 provided in the upper end face of the front end of the stationary side panel 52 is formed in a taper shape having substantially the same taper angle as that of the pin 80. The pin insertion hole 61 formed at the end of the expandable side panel 55 shown in FIG. 4 is also formed in a taper shape having substantially the same taper angle as that of the inner circumferential surface of the pin insertion hole 62 of FIG. 8.

According to the embodiment, the outer circumferential surface of the pin 80 is formed in a taper shape, and the inner circumferential surfaces of the pin insertion holes 61 and 62 are also formed in a taper shape. Accordingly, when the pin 80 is inserted and pulled out, the positions of the pin 80 and the pin insertion hole 62 (or 61) which are slightly shifted can coincide with each other by the guide function of the taper.

Third Embodiment

Figure 9:
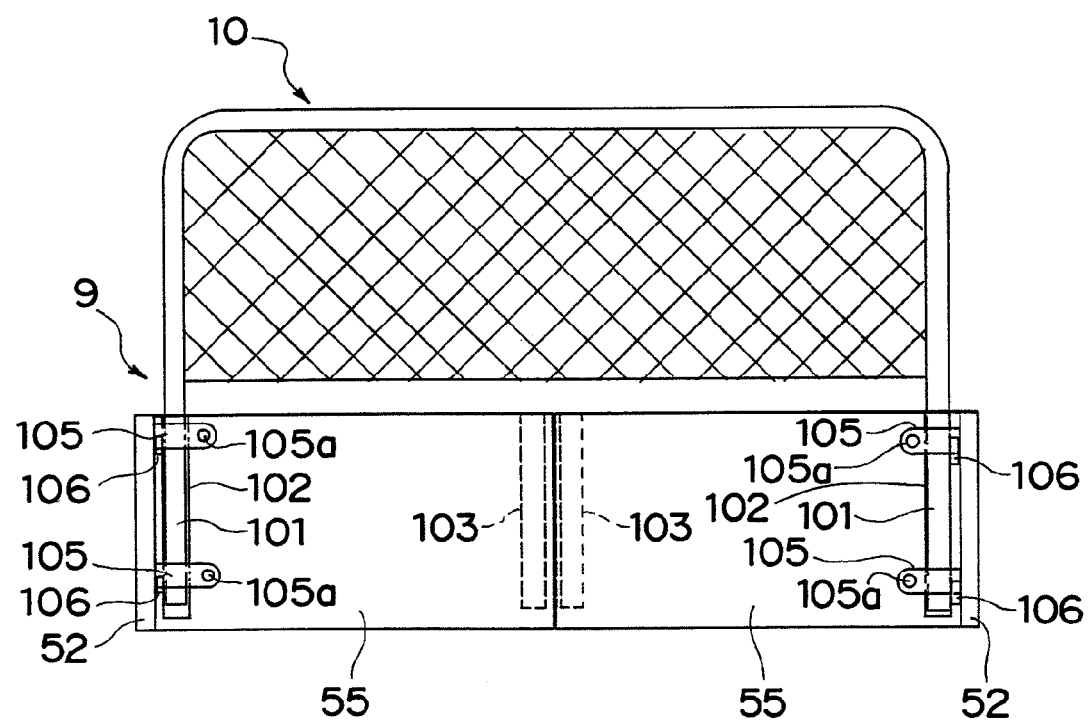
FIG. 9 is a front view of a cargo bed of a pick-up style utility vehicle according to a third embodiment of the present invention.
Figure 10:
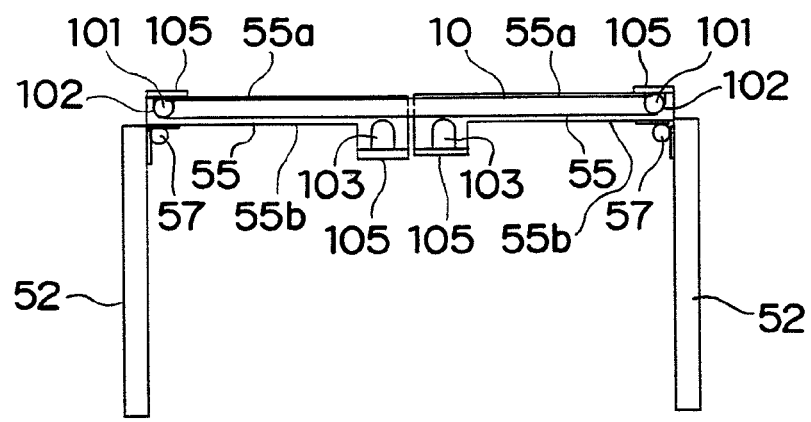
FIG. 10 is a plan view of FIG. 9.
Figure 11:
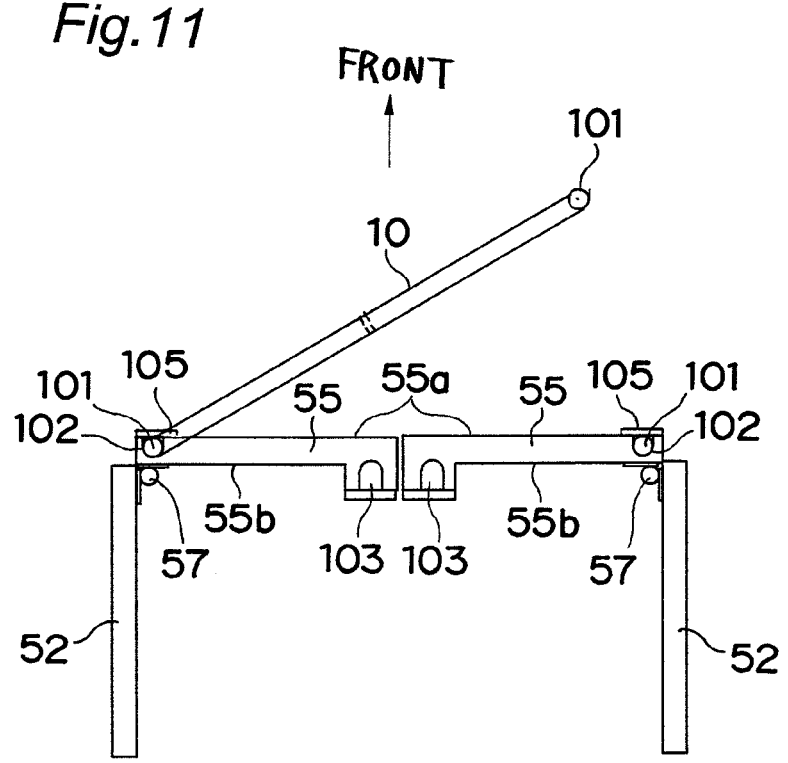
FIG. 11 is the same plan view as FIG. 10 showing the state during the expanding operation of the cargo bed.
Figure 12:
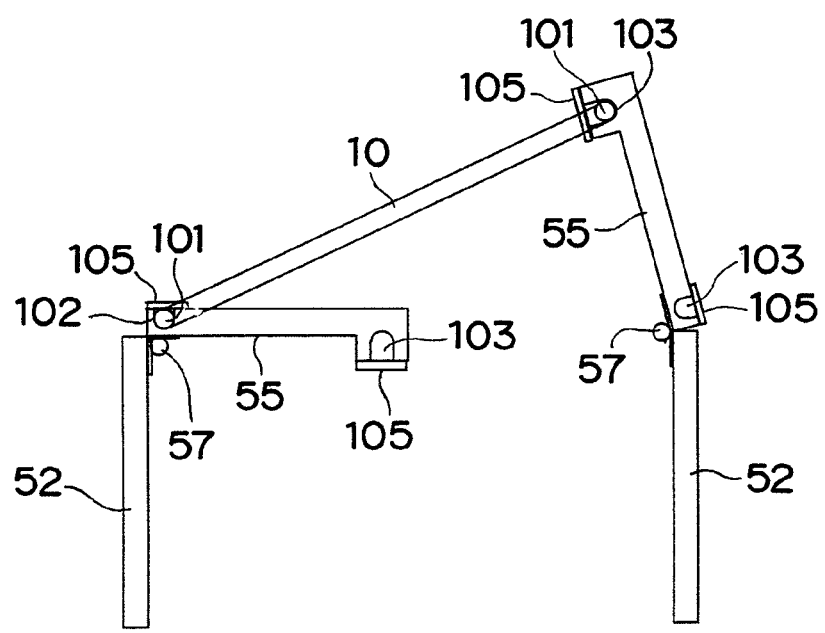
FIG. 12 is the same plan view as FIG. 10 showing the next state of FIG. 11.

FIGS. 9 to 14 show a third embodiment of the present invention. FIG. 9 is a front view of the cargo bed 9. FIG. 10 is a plan view of FIG. 9. FIG. 11 is a plan view showing the state during the expanding operation of the cargo bed 9. FIG. 12 is a plan view showing the next operated state of FIG. 11.

Figure 13:
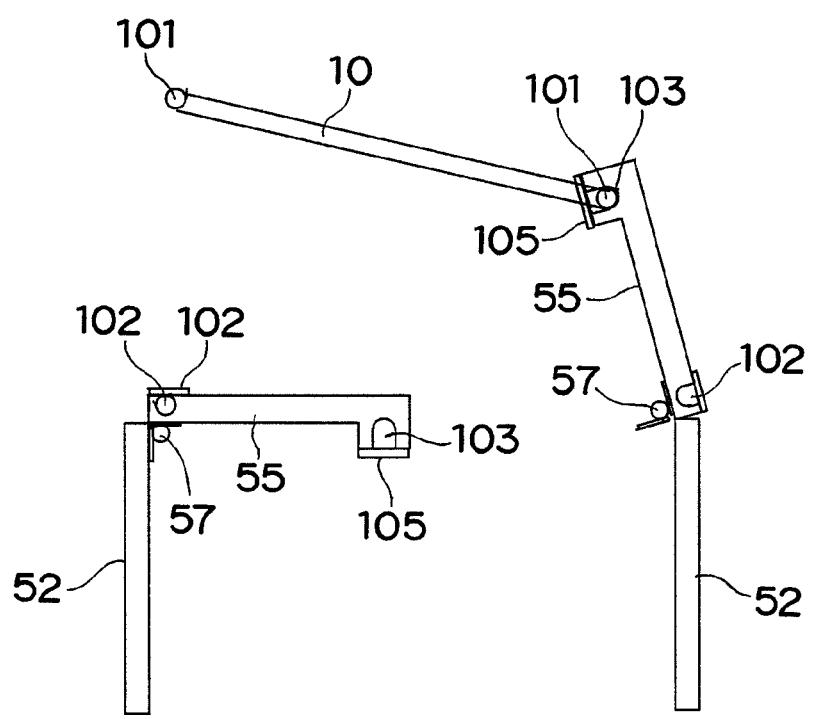
FIG. 13 is the same plan view as FIG. 10 showing the next state of FIG. 12.
Figure 14:
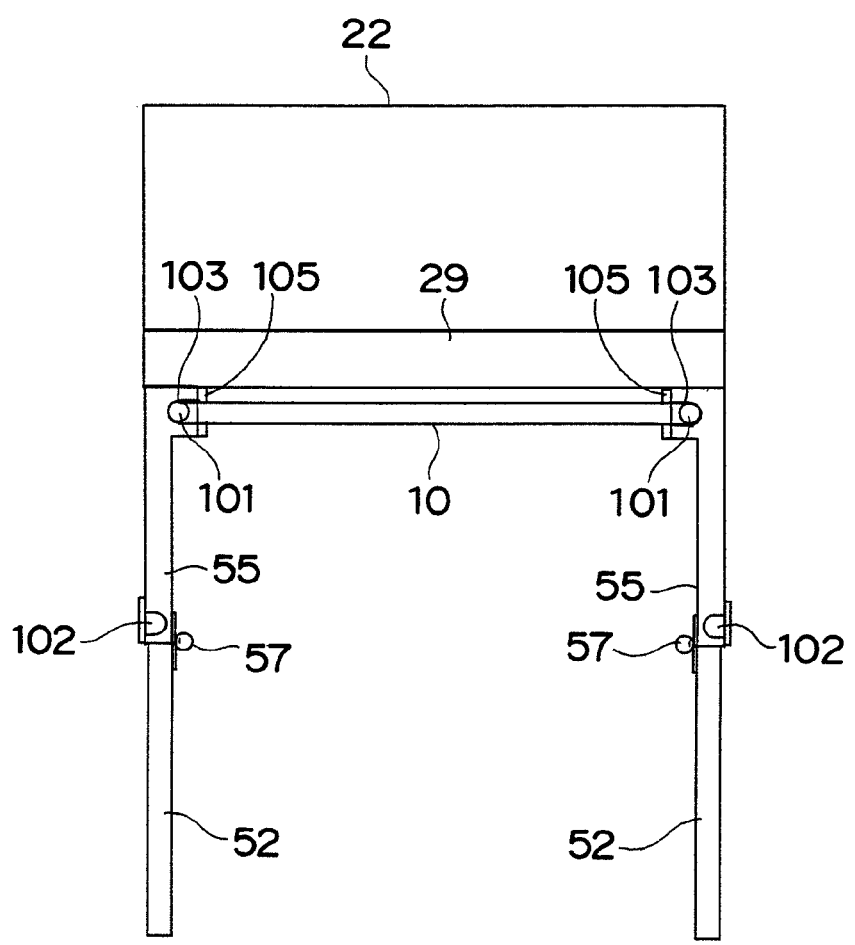
FIG. 14 is the same plan view as FIG. 10 showing the expanded state.

FIG. 13 is a plan view showing the next operated state of FIG. 12. FIG. 14 is the same plan view showing the expanded state.

In FIG. 9, a pair of rods 101 fixing the screen shield and extended downward are formed at both ends of the lower end of the screen shield 10 in a width direction. A pair of rod insertion holes 102 for the non-expanded position is formed in ends of the expandable side panels 55 on the hinge shafts 57 side. A pair of rod insertion holes 103 for the expanded position is formed in ends of the expandable side panels 55 on the opposite side of the hinge shafts 57. The rod insertion holes 102 and 103 are extended downward from the upper end faces of the expandable side panels 55.

In FIG. 10, each of the rod insertion holes 102 for the non-expanded position is opened in one side (the front surface of FIG. 10) 55a of each of the expandable side panels 55, and each of the rod insertion holes 103 for the expanded position is opened in the other side (the rear surface of FIG. 10) 55b of each of the expandable side panels 55. As shown in FIG. 11, when each of the expandable side panels 55 is in the non-expanded position, each of the rod insertion holes 102 for the non-expanded position is opened forward so that the rod 101 of the screen shield 10 can be inserted into and removed from the front (the one side 55a). In addition, each of the rod insertion holes 103 for the expanded position is opened rearward so that the rod 101 of the screen shield 10 can be inserted into and removed from the rear (the other side 55b).

In FIG. 10, lock sections 105 are provided on the opened surfaces of the rod insertion holes 102 and 103, respectively, to prevent the falling of the rod 101. In FIG. 9, each of the lock sections 105 is rotatably supported by each of the expandable side panels 55 via a horizontal rotational shaft 105a and is retained by a stopper 106 so as to be maintained in the lock position. The lock section 105 in a lock state shown in FIG. 9 is rotated about the rotational shaft 105a upward so that the rod 101 can be removed forward from the rod insertion hole 102.

In the third embodiment, the screen shield 10 does not integrally have the front panel and is provided singly. When the cargo bed 9 is in the non-expanded state as shown in FIG. 10, the expandable side panels 55 serve as the front panel. When the cargo bed 9 is in the expanded state, as shown in FIG. 14, the backrest 29 of the rear seat 22 serves as the front panel.

Other configurations are the same as the first embodiment. Like components are indicated by like reference numerals.

The changing operation of the cargo bed will be described. In the 4 passengers transformation, as shown in FIG. 10, each of the expandable side panels 55 is located in the non-expanded position and each of the rods 101 of the screen shield 10 is inserted into the rod insertion hole 102 for the non-expanded position located at either end in a width direction.

When the 4 passengers transformation of FIG. 10 is changed to the 2 passengers transformation, the rear seat 22 is retracted as shown in FIG. 3, as in the operation described in the first embodiment.

As shown in FIG. 11, the lock section 105 of one of the pair of rod insertion holes 102 for the non-expanded position, e.g., the right rod insertion hole 102, is opened to remove the right rod 101 forward from the right rod insertion hole 102. In this case, the screen shield 10 is rotated forward with the left rod 101 as a rotational axis.

As shown in FIG. 12, the right expandable side panel 55 is rotated forward to open the lock section 105 of the rod insertion hole 103 for the expanded position of the right expandable side panel 55, and the right rod 101 is inserted from the left into the rod insertion hole 103 for the expanded position of the right expandable side panel 55.

As shown in FIG. 13, the lock section 105 of the rod insertion hole 102 for the non-expanded position of the left expandable side panel 55 is opened to remove the left rod 101 forward from the rod insertion hole 102 for the non-expanded position of the left expandable side panel 55. In this case, the screen shield 10 is rotated forward with the right rod 101 as a rotational axis.

As shown in FIG. 14, the left expandable side panel 55 is rotated forward to the expanded position to open the lock section 105 of the rod insertion hole 103 for the expanded position of the left expandable side panel 55, and the left rod 101 is inserted from the right into the rod insertion hole 103 for the expanded position of the left expandable side panel 55. Thus, the expanding operation is completed.

In the above operation, the screen shield 10 is moved by rotating the left and right rods 101 as rotational axes. Therefore, the screen shield 10 need not be lifted so that the expanding operation can be easily performed by one operator.

When the 2 passengers transformation shown in FIG. 3 is changed to the 4 passengers transformation shown in FIG. 2 and the cargo bed 9 is contracted into the non-expanded state, the expanding operation may be reversed. Also in this case, the screen shield 10 and the front panel need not be lifted and moved so that the contracting operation of the cargo bed 9 and the moving operation of the screen shield 10 can be easily performed by one person.

Fourth Embodiment

Figure 15:
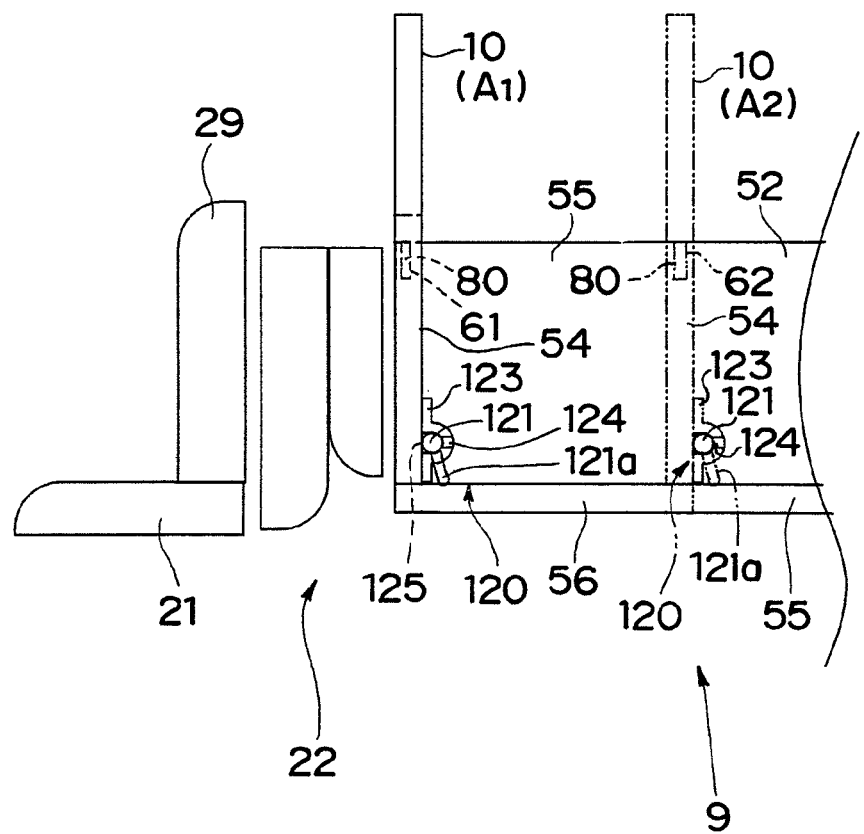
FIG. 15 is a longitudinal side view of a cargo bed of a pick-up style utility vehicle according to a fourth embodiment of the present invention.
Figure 16:
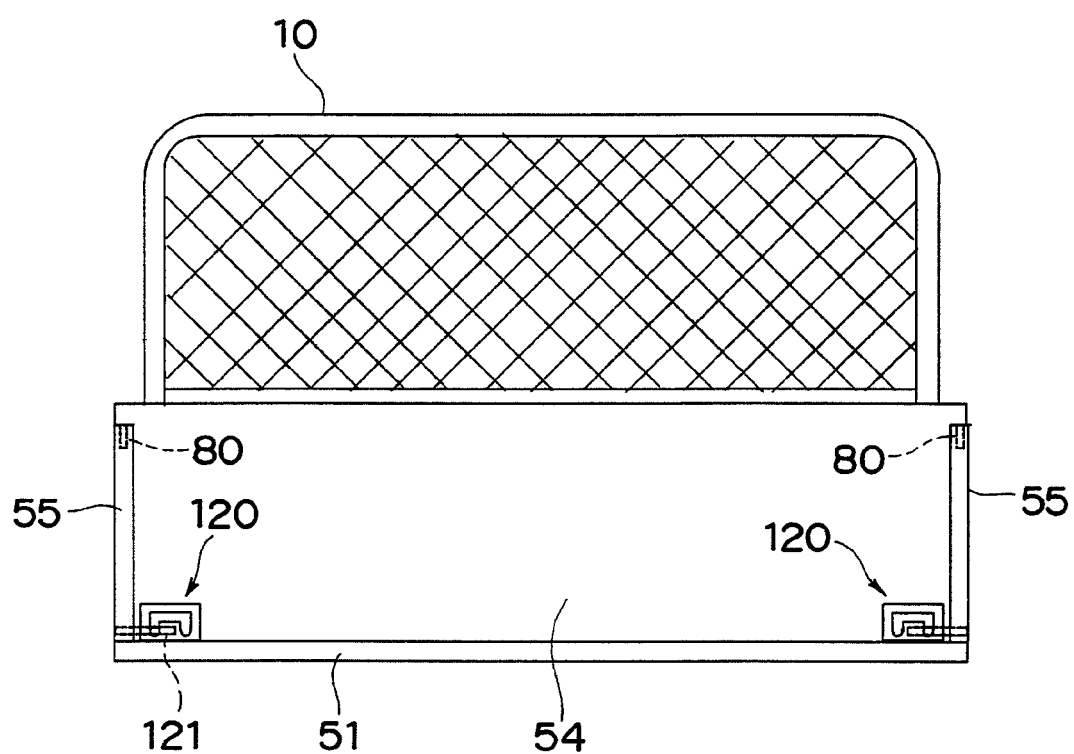
FIG. 16 is a rear view of the cargo bed of the pick-up style utility vehicle according to the fourth embodiment of the present invention of FIG. 15.
Figure 17:
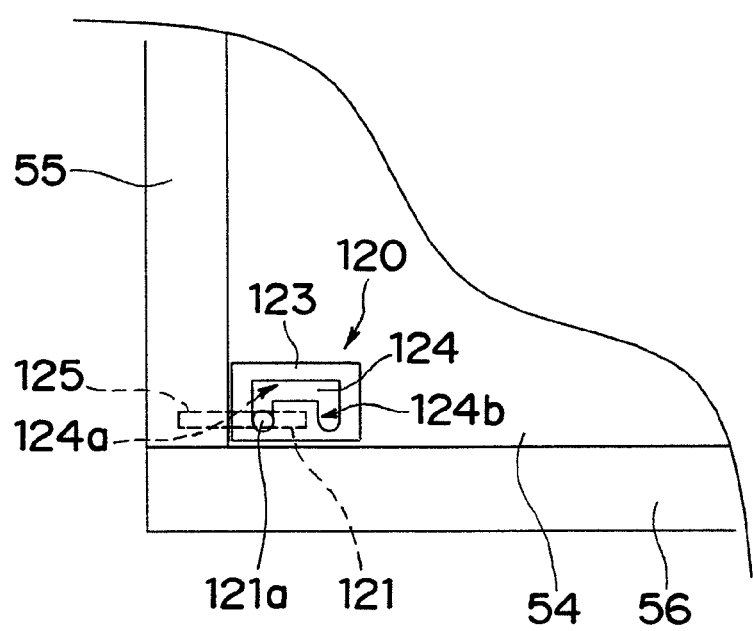
FIG. 17 is an enlarged rear view of front panel fixing means of FIG. 15.

FIGS. 15 to 17 show a fourth embodiment of the present invention which features fixing means of the front panel 54 of the cargo bed 9. FIG. 15 is a longitudinal side view of the cargo bed 9 and the screen shield 10. FIG. 16 is a rear view of the cargo bed. FIG. 17 is an enlarged view of front panel fixing means 120.

In FIG. 16, the screen shield 10 is formed integrally with the front panel 54 and the same pins 80 for fixing the screen shield as the second embodiment are provided at both ends of the lower end of the screen shield 10 in a width direction.

In addition to the screen shield fixing means of the pin 80, the pair of front panel fixing means 120 are provided on the rear surface of the lower end of the front panel 54. The pair of front panel fixing means 120 are arranged at the lower-left corner portion and the lower-right corner portion of the front panel 54.

FIG. 17 shows the front panel fixing means 120 at the lower-left corner portion. The front panel fixing means 120 has a pin case 123 having a U-shaped guide groove 124, a pin 121 supported in the pin case 123, a pin insertion hole 125 formed at the lower end of the expandable side panel 55 and the stationary side panel 52 (FIG. 15).

The pin 121 is supported in the pin case 123 so as to be rotatable about a pin axis and movable in a pin shaft direction (a cargo bed width direction). A knob 121a of the pin 121 passes through the guide groove 124 so as to be protruded to the outside of the pin case 123.

The state of FIG. 17 is the state that the front panel 54 is locked into the expanded position. The end of the pin 121 is inserted into the pin insertion hole 125 of the expandable side panel 55 and the knob 121 is located at the lower end of a vertical portion 124a of one of the guide grooves 124. The knob 121a is moved upward from the state of FIG. 17 and is moved inward in a cargo bed width direction along the horizontal portion at the upper end of the guide groove 124, so that the pin 121 is pulled out of the pin insertion hole 125. The knob 121a is rotated to the lower end of the other vertical portion 124b of the guide groove 124 so that the pin 121 can be maintained in an unlocked state.

When the 2 passengers transformation indicated by a solid line of FIG. 15 is changed to the 4 passengers transformation indicated by an imaginary line and the cargo bed 9 is contracted into the non-expanded state, the pin 121 of the front panel fixing means 120 is pulled out of the pin insertion hole 125 of the expandable side panel 55 to release the fixing of the front panel 54. The pin 80 of the screen shield 10 is pulled out of the pin insertion hole 61 to release the fixing of the screen shield 10.

The expandable side panel 55 is rotated from the expanded position to the non-expanded position. The screen shield 10 and the front panel 54 are moved into the non-expanded position A2. The pin 80 for fixing the screen shield and the pin 80 for fixing the front panel are inserted into the pin insertion holes 62 and 125 of the corresponding stationary side panel 52. Thus, the contracting operation is completed.

In the contracting operation, the operator on the cargo bed 9 can operate the front panel fixing means 120, and the front panel fixing means 120 can be operated without the backrest 29 of the front seat 21 and the backrest 32 of the rear seat 22 being an obstacle.

When the 4 passengers transformation is changed to the 2 passengers transformation, the operator on the cargo bed 9 can operate the front panel fixing means 120 without the backrest 32 of the rear seat 22 and the like being an obstacle, like the above operation.

Fifth Embodiment

Figure 18:
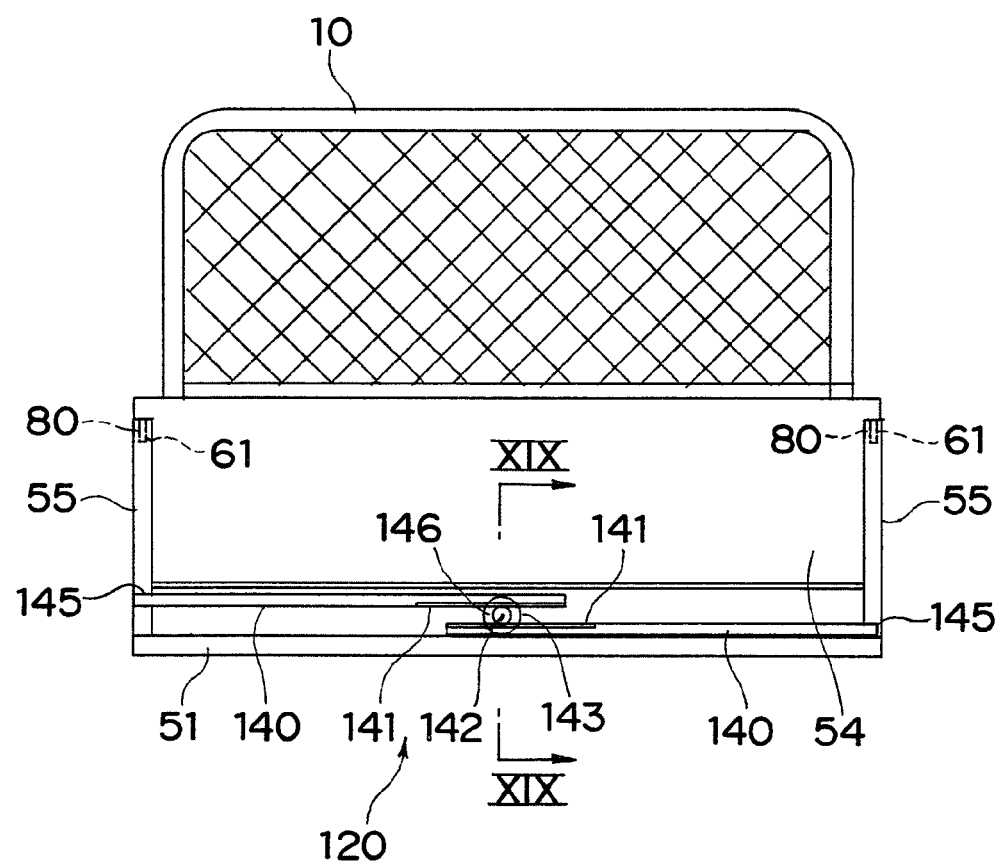
FIG. 18 is a rear view of a cargo bed of a pick-up style utility vehicle according to a fifth embodiment of the present invention.
Figure 19:
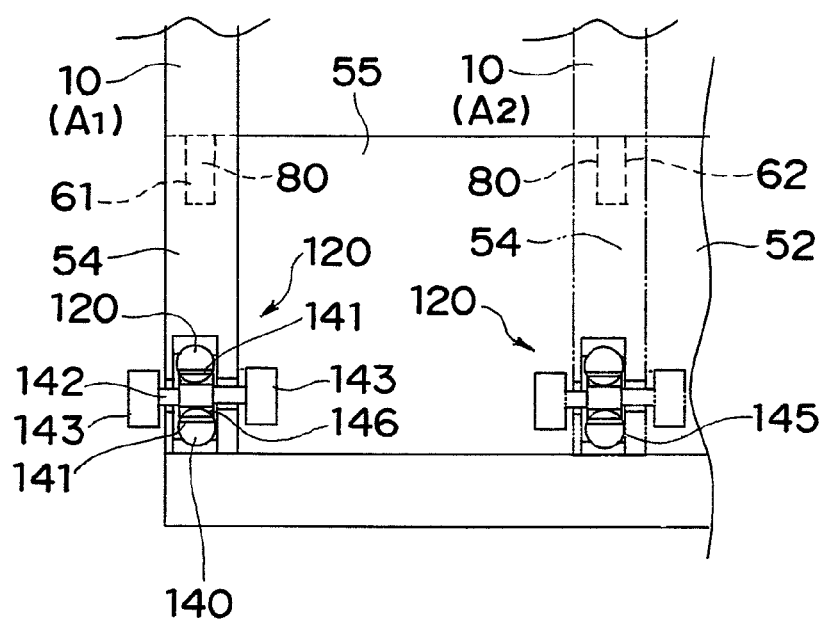
FIG. 19 is a sectional enlarged view taken along line XIX-XIX of FIG. 18.

FIGS. 18 and 19 show a fifth embodiment of the present invention, which features the fixing means 120 of the front panel 54 of the cargo bed 9, like the fourth embodiment. FIG. 18 is a rear view of the cargo bed 9 and the screen shield 10. FIG. 19 is an enlarged view of the front panel fixing means.

In FIG. 18, the front panel fixing means 120 is arranged in the lower end of the front panel 54, and has a pair of rods 140 extended in a cargo bed width direction, a pinion 146 arranged in the center portion in a cargo bed width direction, and rod insertion holes 145 formed in the expandable side panels 55 and the stationary side panels 52 (FIG. 19).

The pair of rods 140 are arranged so as to be spaced in an up-down direction so that one rod 140 is arranged on the right side and the other rod 140 is arranged on the left side. Both the rods 140 are supported in the front panel 54 so as to be movable in a cargo bed width direction and are insertable into the rod insertion holes 145 of the expandable side panels 55 and the rod insertion holes 145 of the stationary side panels 52 of FIG. 19.

In FIG. 19, a plurality of rack teeth 141 are formed in the lower surface of the upper rod 140 and the upper surface of the lower rod 140, respectively, and engage the upper end and the lower end of the pinion 146. The one pinion 146 and the rack teeth 141 configure a pinion-and-rack operating portion.

A shaft portion 142 of the pinion 146 is rotatably supported by the front panel 54 and is protruded forward and rearward from the front panel 54. Knobs 143 are fixed to the front end and the rear end of the shaft portion 142.

The pinion 146 can be rotated by either of the front knob 143 and the rear knob 143. The pinion 146 is rotated so that the left and right rods 140 of FIG. 18 are moved in opposite directions.

When the 2 passengers transformation indicated by a solid line of FIG. 19 is changed to the 4 passengers transformation indicated by an imaginary line and the cargo bed 9 is contracted into the non-expanded state, either of the front knob 143 and the rear knob 143 is rotated and both the rods 140 are moved to the center side in a cargo bed width direction so as to be pulled out of the pin insertion holes 145 of the expandable side panels 55 at the same time. The pins 80 of the screen shield 10 shown in FIG. 18 are pulled out of the pin insertion holes 61 of the expandable side panels 55 to release the fixing of the screen shield 10.

The expandable side panels 55 are rotated from the expanded position to the non-expanded position to move the screen shield 10 and the front panel 54 into the non-expanded position A2. The pins 80 for fixing the screen shield are inserted into the pin insertion holes 62 (FIG. 19) of the stationary side panels 52. By rotating the knobs 143, both the rods 140 are moved outward in a cargo bed width direction and are then inserted into the pin insertion holes 145 of the corresponding stationary side panels 52.

When the 4 passengers transformation is changed to the 2 passengers transformation, the above operation is performed.

According to the embodiment, the left and right rods 140 can be operated at the same time by the operation of the one pinion 146 arranged in the center portion in a cargo bed width direction, which leads to easy operation.

Modification of the Fifth Embodiment

Figure 20:
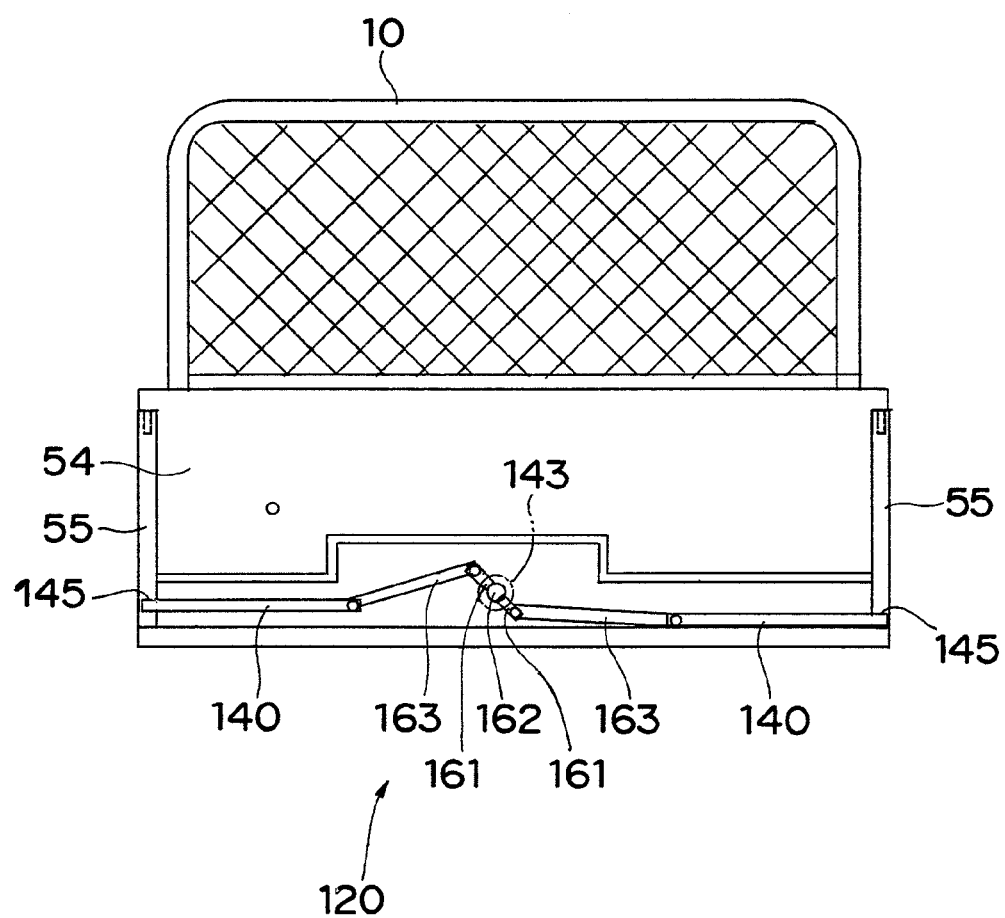
FIG. 20 is a rear view of a cargo bed of a pick-up style utility vehicle showing a modification example of the fifth embodiment of the present invention.
Figure 21:
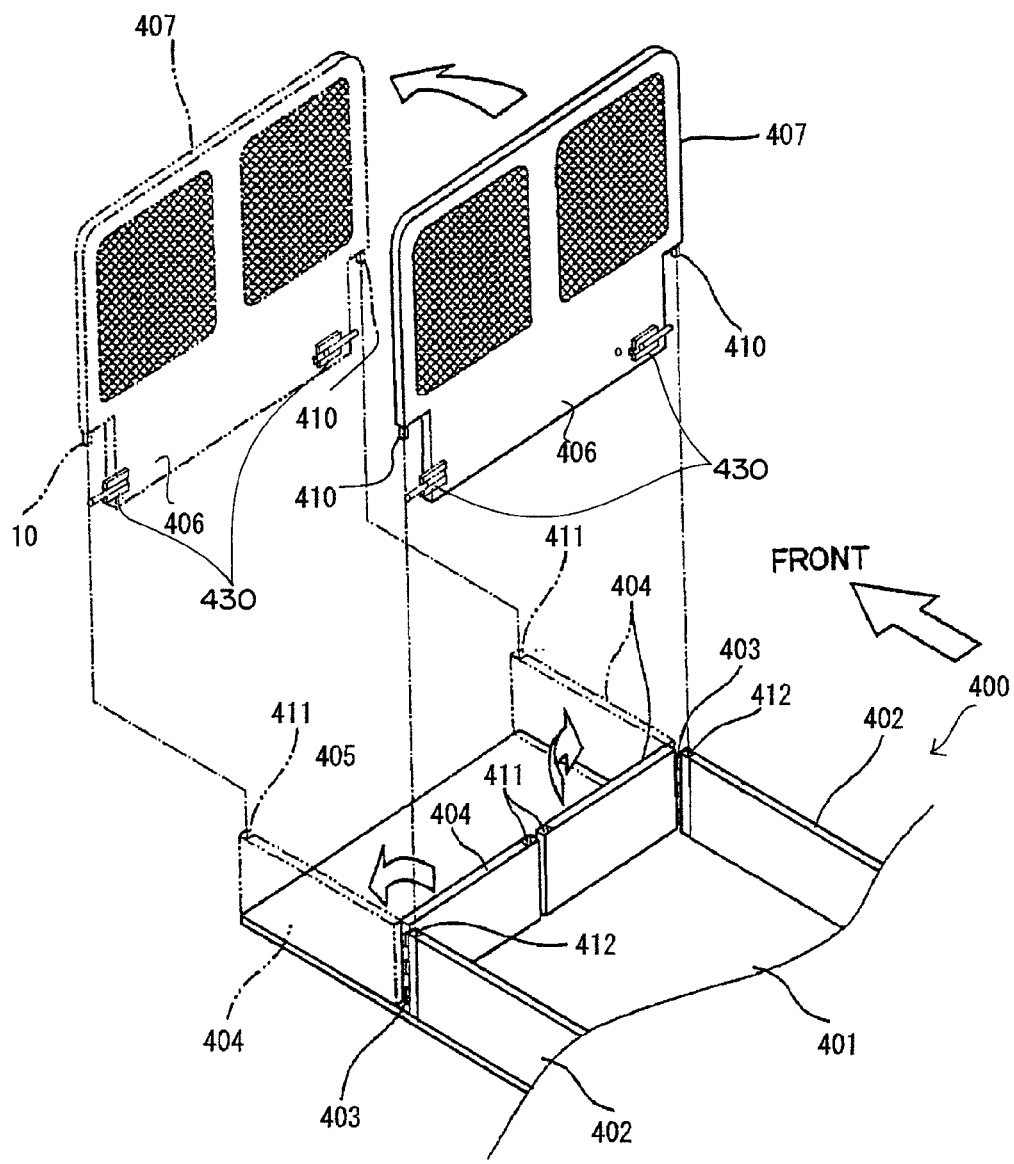
FIG. 21 is a perspective view of the related art.

FIG. 20 shows a variation of the fifth embodiment. As the operating portion, in place of the rack-and-pinion mechanism of FIG. 19, a pair of link mechanisms is provided and the left and right rods 140 are operated at the same time via the link mechanisms.

A rotational shaft 162 having a pair of link arms 161 are rotatably provided in the center portion of the cargo bed 9 in a width direction. Each of the link arms 161 is coupled to each of the rods 140 via each of different link arms 163. The same knobs 143 as FIG. 19 are fixed to the front end and the rear end of the rotational shaft 162.

The operation of the front panel fixing means 120 is the same as FIGS. 18 and 19. The knobs 143 of the center of the cargo bed 9 in a width direction are operated to move both the rods 140 in opposite directions at the same time via the link mechanisms to fix and release the front panel 54.

Other Embodiments (1) In the above embodiments, the expandable side panel is rotatable about the hinge shaft. The respective inventions of the present invention are applicable to the cargo bed in which it is slid forward and rearward so that it is position changed between the expanded position and the non-expanded position.

(2) In FIG. 4, the hinge 41 can also be covered by a resin cover. The hinge 41 is covered by the resin cover to prevent dirt and sand from entering into the hinge 41 and the hard change of the cargo bed.

(3) The present invention is not limited to the configurations of the above embodiments and includes various modification examples contemplated in the scope without departing from the contents described in the scope of claims.

What is claimed is:

1. The pick-up style utility vehicle comprising:
    a front seat;
    a rear seat positioned rearward of the front seat; and
    a cargo bed positioned rearward of the rear seat, the cargo bed including a stationary bottom plate, a pair of side panels extending from left and right sides of the bottom plate, respectively, and a front panel, wherein each of the side panels includes a stationary side panel and an adjustable side panel connected to a front end of the stationary side panel; and
    a screen shield disposed between the cargo bed and a rear seat riding space in front of the cargo bed such that the screen shield separates the cargo bed from the rear seat riding space in front of the cargo bed, the screen shield being integrally connected to the front panel of the cargo bed, wherein:
    the cargo bed is changeable between an expanded state in which the cargo bed is expanded forward into the rear seat riding space by adjusting the position of the adjustable side panels and the position of the screen shield and a non-expanded state not occupying the rear seat riding space;
    the screen shield is shiftable between an expanded position corresponding to the expanded state of the cargo bed and a non-expanded position corresponding to the non-expanded state of the cargo bed;
    front panel fixing means for fixing the front panel to the side panels of the cargo bed in the expanded position and in the non-expanded position;
    the front panel fixing means include first rod insertion holes provided in the left-side side panel, second rod insertion holes provided in the right-side side panel, a first rod supported by the front panel so as to be insertable in the first rod insertion holes, and a second rod supported by the front panel so as to be insertable into the second rod insertion holes, and an operating portion for operating the first and second rods at the same time;
    the operating portion includes a rotatable rotational shaft coupled to the first and second rods;
    the rotational shaft is aligned with a center portion of the cargo bed in a vehicle width direction; and
    the rotational shaft is coupled to the first and second rods by a pair of first link arms formed on the rotational shaft and a pair of second link arms connecting the first link arms to the first and second rods, respectively.

2. The pick-up style utility vehicle according to claim 1, further comprising a first knob and a second knob fixed to a front end and a rear end of the rotational shaft, respectively, wherein rotation of either of the first and second knobs effects simultaneous movement of the first and second rods in opposite directions via the first and second link arms.

* * * * *